(12) United States Patent
Ghamsari et al.

(10) Patent No.: US 11,661,031 B2
(45) Date of Patent: May 30, 2023

(54) SYSTEM FOR MANAGING ACCESS TO A VEHICLE BY A SERVICE PROVIDER THAT IS TO PROVIDE A SERVICE ASSOCIATED WITH THE VEHICLE

(71) Applicant: Capital One Services, LLC, McLean, VA (US)

(72) Inventors: Avid Ghamsari, Carrollton, TX (US); Micah Price, The Colony, TX (US); Qiaochu Tang, Frisco, TX (US); Geoffrey Dagley, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/449,360

(22) Filed: Sep. 29, 2021

(65) Prior Publication Data

US 2023/0101560 A1    Mar. 30, 2023

(51) Int. Cl.
*B60R 25/24* (2013.01)
*G07C 9/22* (2020.01)
*G07C 9/00* (2020.01)
*B60R 25/20* (2013.01)
*B60R 25/01* (2013.01)
*G07C 9/27* (2020.01)

(52) U.S. Cl.
CPC ............ *B60R 25/24* (2013.01); *B60R 25/01* (2013.01); *B60R 25/2018* (2013.01); *G07C 9/00309* (2013.01); *G07C 9/22* (2020.01); *G07C 9/27* (2020.01); *B60R 2325/205* (2013.01); *G07C 2009/00769* (2013.01)

(58) Field of Classification Search
CPC ..... B60R 25/24; B60R 25/01; B60R 25/2018; B60R 2325/205; G07C 9/22; G07C 9/27; G07C 9/00309; G07C 2009/00769
See application file for complete search history.

(56) References Cited

U.S. PATENT DOCUMENTS

| | | | |
|---|---|---|---|
| 9,688,247 B1* | 6/2017 | Jayaraman | H04L 9/32 |
| 2015/0332531 A1* | 11/2015 | Davidsson | E05B 47/0001 70/256 |
| 2015/0363986 A1* | 12/2015 | Hoyos | G07C 9/00563 340/5.61 |
| 2017/0109828 A1* | 4/2017 | Pierce | G06Q 40/08 |
| 2017/0180125 A1* | 6/2017 | Bobinski | H04L 9/3263 |
| 2018/0126952 A1* | 5/2018 | Niemiec | G07C 9/20 |

* cited by examiner

*Primary Examiner* — Thomas D Alunkal
(74) *Attorney, Agent, or Firm* — Harrity & Harrity, LLP

(57) ABSTRACT

In some implementations, a system may receive an access request associated with an agent and the vehicle. The system may authenticate, based on an agent identification associated with the agent, the agent in association with providing the vehicle service. The system may send, based on authenticating the agent, an authorization request to a user associated with the vehicle, wherein the authorization request is sent to a user device associated with the user that enables the user to authorize the agent to access the vehicle in association with providing the vehicle service. The system may receive, from the user device, a user authorization that authorizes the agent to access the vehicle. The system may configure the vehicle to enable the agent to access the vehicle via a client device associated with the agent.

20 Claims, 7 Drawing Sheets

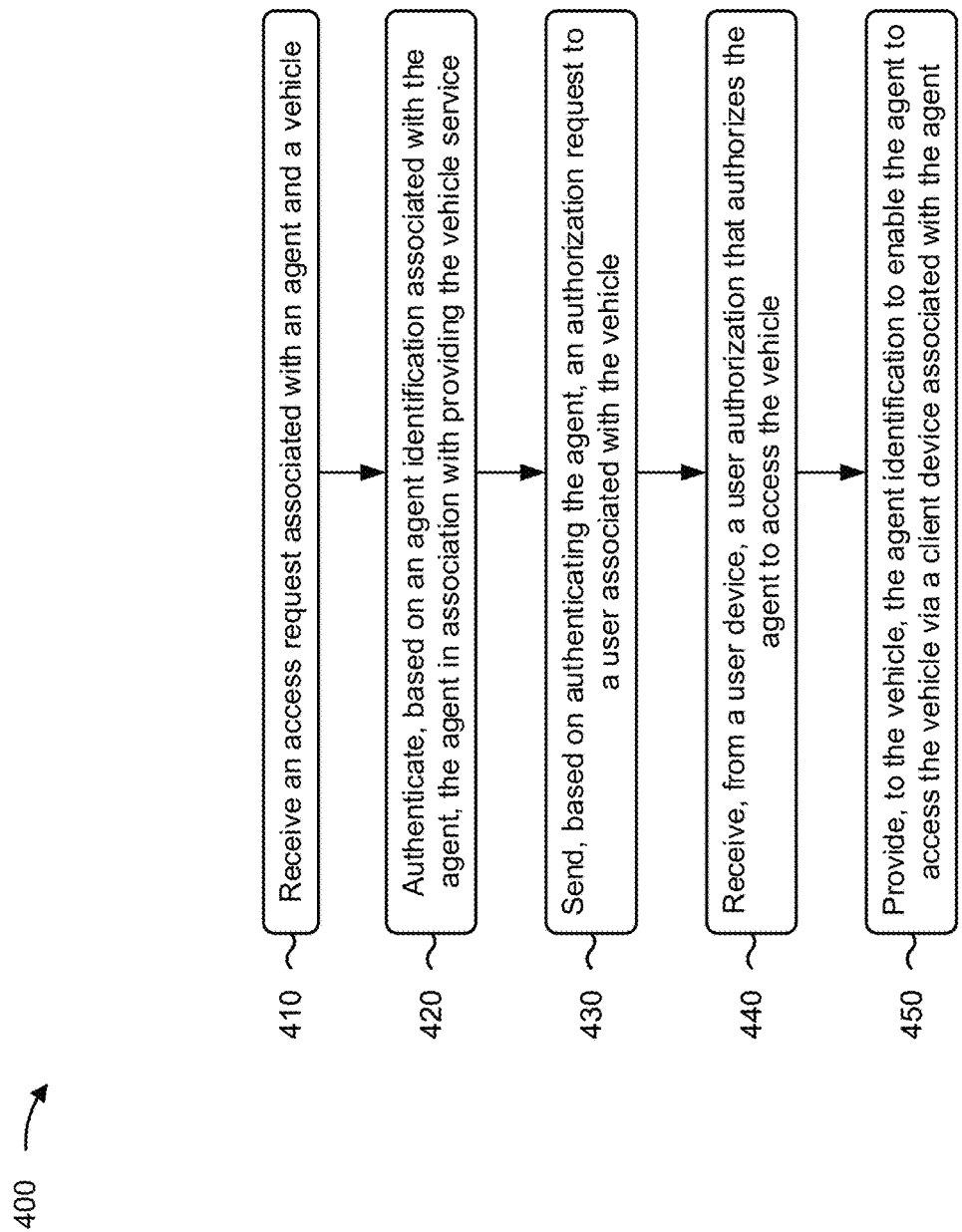

SYSTEM FOR MANAGING ACCESS TO A VEHICLE BY A SERVICE PROVIDER THAT IS TO PROVIDE A SERVICE ASSOCIATED WITH THE VEHICLE

BACKGROUND

A service provider may be organized or configured to provide one or more vehicle services for an individual, such an owner of a vehicle. In such cases, in association with providing a vehicle service, an agent (or representative) of the service provider typically needs to have access to the vehicle. As an example, a mechanic that is to repair the vehicle may need to drive the vehicle to a repair bay of an auto repair shop and/or turn the vehicle on to test repairs to the vehicle. As another example, a valet driver that is parking a vehicle for an owner of the vehicle may need to drive the vehicle to and/or from a parking spot.

SUMMARY

Some implementations described herein relate to a system for enabling access to a vehicle in association with providing a vehicle service. The system may include one or more memories and one or more processors communicatively coupled to the one or more memories. The one or more processors may be configured to receive an access request associated with an agent and the vehicle. The one or more processors may be configured to perform, based on the agent identification, an authentication process to verify that the agent is authorized to provide the vehicle service. The one or more processors may be configured to send, based on verifying that the agent is authorized to provide the vehicle service, an authorization request to request a user associated with the vehicle to authorize the agent to access the vehicle. The one or more processors may be configured to receive, from the user device, a user authorization that authorizes the agent to access the vehicle. The one or more processors may be configured to provide, to the vehicle, the agent identification to enable the agent to access the vehicle via a client device associated with the agent.

Some implementations described herein relate to a non-transitory computer-readable medium that stores a set of instructions for a device. The set of instructions, when executed by one or more processors of the device, may cause the device to maintain, in a vehicle registry, a vehicle entry that indicates that a user is associated with a vehicle. The set of instructions, when executed by one or more processors of the device, may cause the device to maintain, in an entity registry, an entity entry that indicates that an entity is associated with providing a vehicle service. The set of instructions, when executed by one or more processors of the device, may cause the device to receive, from a client device associated with the entity, an access request that identifies the vehicle. The set of instructions, when executed by one or more processors of the device, may cause the device to send, based on the vehicle entry and the access request identifying the vehicle and the entity, an authorization request to a user device associated with the user. The set of instructions, when executed by one or more processors of the device, may cause the device to receive, from the user device, a user authorization that authorizes the entity to access the vehicle. The set of instructions, when executed by one or more processors of the device, may cause the device to configure, using an identifier associated with the entity, the vehicle to enable access to the vehicle based on the vehicle receiving the identifier from the client device via a short range communication signal.

Some implementations described herein relate to a method enabling access to a vehicle in association with providing a vehicle service. The method may include receiving, by a device, an access request associated with an agent and the vehicle. The method may include authenticating, by the device and based on an agent identification associated with the agent, the agent in association with providing the vehicle service. The method may include sending, by the device and based on authenticating the agent, an authorization request to a user associated with the vehicle, where the authorization request is sent to a user device associated with the user that enables the user to authorize the agent to access the vehicle in association with providing the vehicle service. The method may include receiving, by the device and from the user device, a user authorization that authorizes the agent to access the vehicle. The method may include configuring, by the device, the vehicle to enable the agent to access the vehicle via a client device associated with the agent.

BRIEF DESCRIPTION OF THE DRAWINGS

FIG. 4 is a flowchart of an example process relating to managing access to a vehicle by a service provider that is to provide a service associated with the vehicle.

DETAILED DESCRIPTION

Figure 1A:
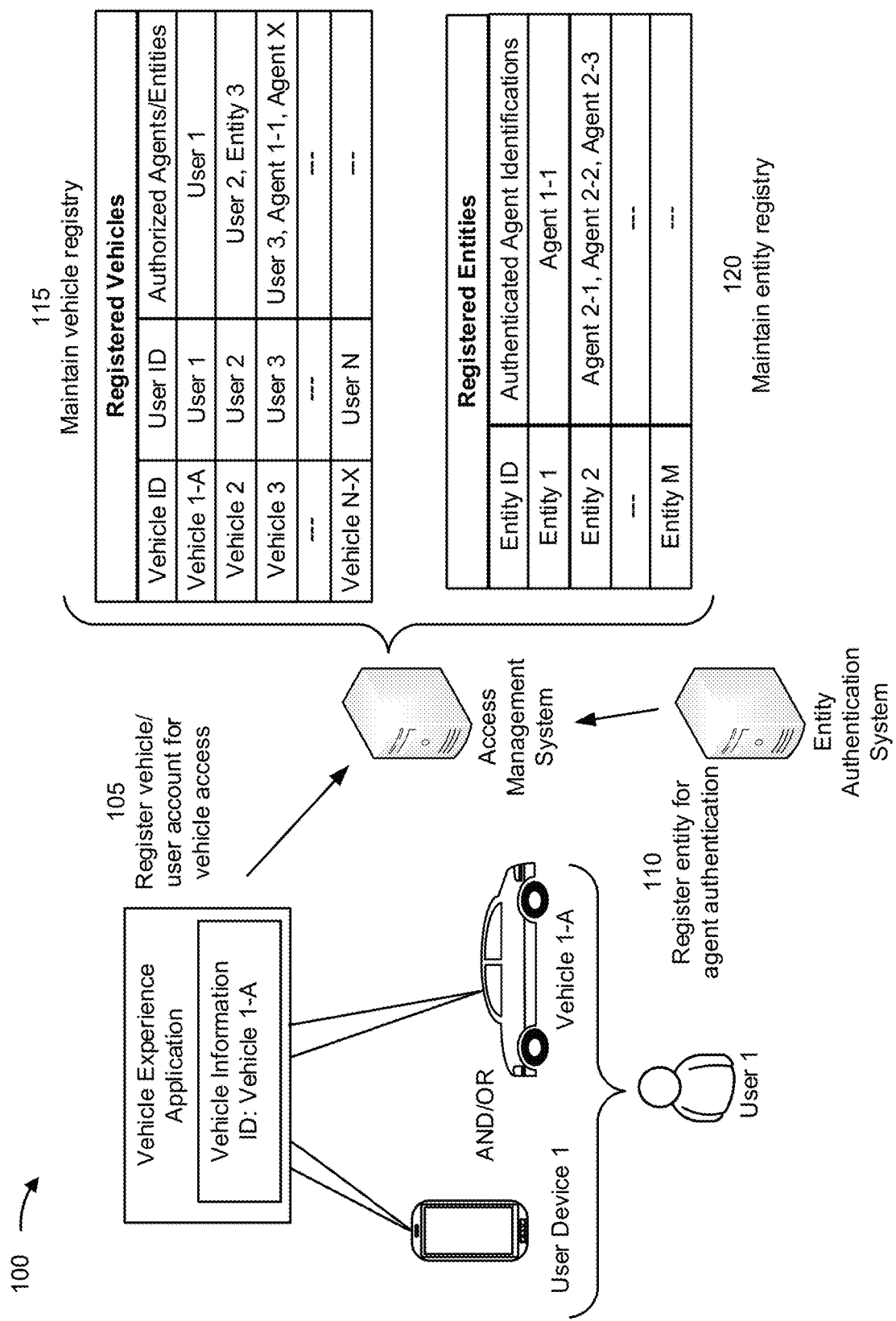
FIGS. 1A-1D are diagrams of an example implementation associated with managing access to a vehicle by a service provider that is to provide a service associated with the vehicle.

The following detailed description of example implementations refers to the accompanying drawings. The same reference numbers in different drawings may identify the same or similar elements.

When an owner of a vehicle is to receive a vehicle service from a vehicle services provider, the owner typically authorizes an agent of the vehicle services provider to access the vehicle in association with providing the vehicle service. Access to the vehicle may involve the agent unlocking a door of the vehicle, starting or stopping an engine of the vehicle, controlling a setting of the vehicle, and/or driving the vehicle. Such access can be provided by providing a physical vehicle key to the vehicle that enables the agent to access the vehicle. However, physical keys can be unsecure as the physical keys can be duplicated by bad actors. Furthermore, unless the vehicle is left unlocked with the physical key in the vehicle (which leaves the vehicle susceptible to theft or a breach by a bad actor), the owner may need to interact with a vehicle services provider and/or drop a key in a lockbox of the vehicle services provider, which can be inconvenient to an owner of the vehicle.

In some cases, a vehicle can be accessed or controlled using a digital vehicle key. In such cases, a temporary digital vehicle key can be generated, provisioned, and/or provided to a client device (e.g., a mobile device, such as a smartphone or other type of device that can store a digital vehicle key) associated with a vehicle services provider. The client device, equipped with the digital vehicle key, may enable an agent of the vehicle services provider to access the vehicle via the client device. However, unless the agent has a specific client device that is equipped with the temporary digital vehicle key, the agent may be unable to access the vehicle.

Furthermore, transferring the temporary digital vehicle key (e.g., over a network or a communication link) may expose the temporary digital key to being intercepted by a bad actor (e.g., a bad actor monitoring a network or a communication link between the client device and a device that generated, provisioned, and/or provided the temporary digital key). Moreover, as with a physical vehicle key, the temporary digital vehicle key, once received by a client device, could be hacked, duplicated, or transferred to another device. Therefore, provisioning a digital vehicle key (e.g., including a temporarily available digital vehicle key) to permit an agent to access a vehicle may leave the vehicle susceptible to a bad actor that can duplicate the digital vehicle key and/or that can obtain a copy of the duplicated digital vehicle key. Moreover, interception or duplication of a digital vehicle key can be difficult (or impossible) to track and/or identify before a bad actor gains unauthorized access to the vehicle, and identifying a bad actor involved in an unauthorized access to a vehicle via a duplicated digital vehicle key can be relatively complex. Accordingly, there is a need for a system that enables traceable access to a vehicle by one or more authorized agents of a vehicle services provider.

Some implementations described herein provide an access management system that manages and tracks access, by an agent associated with an entity, to a vehicle of a user based on an authentication of an identification of the agent (e.g., by the entity) and/or an authorization obtained from the user. As described herein, the access management system may maintain a vehicle registry of vehicles associated with users and an entity registry of entities associated with (or corresponding to) registered (and/or validated) vehicle services providers. Using the vehicle registry and the entity registry, the access management system may provide on-demand authentication of an agent requesting access to a vehicle (or attempting access to the vehicle) and/or facilitate on-demand access to the vehicle based on a verified identification of the agent (and/or a verification that the agent is associated with an entity authorized to access the vehicle).

In this way, the access management system may enable secure and traceable access to a vehicle, by an agent associated with a vehicle services provider (and/or an individual other than an owner of the vehicle). The access management system, as described herein, enables the secure and traceable access via an authenticated identity (or identification) of the agent and/or an authenticated identification of an entity as a vehicle services provider that is authorized (e.g., by the owner) to access the vehicle. Accordingly, the access management system may facilitate secure access to the vehicle by the agent without an owner of the vehicle having to provide a physical vehicle key to the vehicle, which may improve a user experience with respect to receiving a vehicle service.

Furthermore, the access management system, as described herein, may facilitate access to the vehicle without generating, provisioning, or providing a digital vehicle key to a client device to enable access the vehicle, thereby conserving computing resources (e.g., processor resources and/or memory resources to generate or provision a digital vehicle key) and/or communication resources (e.g., network resources or communication link resources to transmit or receive a digital vehicle key) otherwise used in association with using a digital vehicle key and/or a client device, while maintaining security of the vehicle restricting digital vehicle key access and/or tracing which agent and/or entity accessed the vehicle.

FIGS. 1A-1D are diagrams of an example implementation 100 associated with managing access to a vehicle by a service provider that is to provide a service associated with the vehicle. Example implementation 100 includes an access management system, a user device (User Device 1) associated with a user (User 1), a vehicle associated with the user, and one or more entity authentication systems, and a client device associated with an agent (Agent 1-2). These devices are described in more detail below in connection with FIG. 2 and FIG. 3.

In example implementation 100, an application (Vehicle Access Application) may be installed on the user device, the vehicle, and/or the client device to facilitate and/or manage access to the vehicle, as described herein. In some implementations, individual instances of the application may be installed on the user device, the vehicle, and/or the client device. The access management system may serve as a backend system of the application (e.g., an application server of the application).

As described in connection with example implementation 100, a "user" may be an owner of a vehicle and/or a manager of a vehicle (e.g., an individual that is authorized to enable access or use of the vehicle). An "agent" may be an individual (e.g., a third party, such as an individual other than the user or an individual associated with the access management system) that may receive authorized access to a vehicle of a user, as described herein. The agent may be associated with an entity. For example, the agent may be an employee or representative of the entity.

An entity, as described herein, may be a vehicle services provider, such as an organization or enterprise, that provides a vehicle service involving access to a vehicle. For example, the entity may be an organization that provides vehicle maintenance (e.g., a dealership, an auto repair shop, and/or an autobody shop). In such a case, the agent may be a mechanic or representative that may need access to the vehicle to test the vehicle or drive the vehicle to one or more locations in association with providing vehicle maintenance for the user. As another example, the entity may be an organization that provides a valet service (e.g., a valet company, a hotel, and/or a restaurant). In such a case, the agent may be a valet driver or representative that may need access to the vehicle in order to park the vehicle for the user and/or return the vehicle to the user. In some implementations, the entity may be associated with a rideshare organization, a chauffeur organization, or a transportation organization that employs agents to drive vehicles associated with users. In such a case, the agent may be a driver that provides a rideshare service or transportation service to the user and/or in association with the user owning or managing the vehicle.

As shown in FIG. 1A, and by reference number 105, the access management system registers a vehicle and/or user account for vehicle access management. For example, the access management system may register the vehicle and/or the user account via the application (e.g., an instance of the application installed on the user device and/or an instance of the application installed on an onboard computer of the vehicle). The application may be configured to authenticate the user in association with setting up a user account associated with the access management system. For example, the application may utilize a user credential and/or a biometric of the user (e.g., a fingerprint, a facial structure, or other type of biometric) to verify that the user is an authorized user associated with the user account (e.g., when the user logs into the application and/or interacts with certain functions of the application). The user account may be utilized by the user and/or the access management system to manage access to one or more vehicles of the user.

An instance of the application on the user device may correspond to a user-side version of the application. The user-side version may include certain features of the application that are specific to users and/or owners of the vehicle, such as registering one or more vehicles for vehicle access management, authenticating a user of the user device, authorizing an agent to access the vehicle, monitoring vehicle access information associated with the vehicle, or the like.

An instance of the application on the vehicle may correspond to a vehicle-side version of the application. The vehicle-side version may include certain features that are specific to the vehicle, such as receiving/maintaining identifications of entities (e.g., individual drivers or organizations) that are authorized to access a vehicle, monitoring for devices (e.g., client devices) that are associated with individuals or entities that are authorized to access the vehicle, controlling an access device of the vehicle (e.g., a locking mechanism associated with a door of the vehicle, a computer of the vehicle, an onboard application of the vehicle, or other onboard feature of the vehicle) to enable an individual to access the vehicle and/or a feature of the vehicle, authenticating a user of the user device, authorizing a driver (other than the user) to access the vehicle, monitoring vehicle access information associated with the vehicle, or the like.

As further shown in FIG. 1A, and by reference number 110, the access management system registers an entity for agent authentication. For example, the entity (or a representative of the entity) may request, via the entity authentication system, the access management system to register the entity as a valid vehicle services provider that may provide a vehicle service associated with a vehicle (the vehicle or other vehicles associated with other users). The access management system may review and/or validate the entity as a valid vehicle services provider using any suitable technique (e.g., validation of credentials of the entity, background checks, business-related credentials, industrial standing, and so on). Based on the access management system (and/or an individual associated with the access management system) verifying that the entity is a valid vehicle services provider, the access management system may generate and/or store an entity entry in the entity registry to register the entity as a valid vehicle services provider.

The entity authentication system may be associated with a device or backend system of an entity that is configured to authenticate agents associated with the entity. Although example implementation 100 is described in connection with an entity that is associated with a vehicle services provider, the entity may be associated with another type of service provider. For example, the entity and/or agent may be associated with a service provider associated with providing a service for another type of object of the user, such as a home service provider that is to access, using a client device, a home of the user as described herein. Furthermore, in some implementations, the entity authentication system may be an independently operated authentication system associated with an independent agency (e.g., an agency that is not associated with the access management system or a service provider, such as a governmental agency or industrial standard agency) that is capable of authenticating an agent and/or validating an agent's identification, as described herein.

An instance of the application on the entity authentication system may correspond to an entity-side version of the application. The entity-side version may include certain features of the application that are specific to vehicle services providers that provide a vehicle service associated with a vehicle, such as requesting registration with the access management system, verifying an identification associated with the entity (an "entity identification") and/or verifying an identification associated with an agent ("agent identification") in association with an authentication process described herein.

Accordingly, prior to a request from an agent of the entity requesting access to a vehicle described elsewhere herein, the entity may be preconfigured as a valid vehicle services provider that is capable of authenticating an agent of the entity, as described herein.

As further shown in FIG. 1A, and by reference number 115, the access management system maintains a vehicle registry. The vehicle registry may be associated with vehicles that are associated with one or more users and/or user accounts of the application. For example, the vehicle registry, as shown, may include vehicle entries associated with user accounts of the vehicle access application and corresponding vehicles that are associated with respective users of the user accounts. As described herein, the access management system may maintain the vehicle registry to verify, based on a vehicle entry associated with a vehicle, that an agent is authorized to access the vehicle.

As shown, the vehicle registry may include a registry of N user accounts (User 1 through User N) identified by user identifications (User IDs). In the vehicle registry, a first vehicle entry, identified by a vehicle identification (Vehicle 1-A) of the vehicle is associated with a first user account. As shown, the first user is account is associated with the user via a user identification of the user (User 1). As further shown, in an authorized agents or entities field of the vehicle entry (Authorized Agents/Entities), the user has not authorized (or has yet to authorize at that moment in time) any agents or any entities to have access to the vehicle, as described herein.

As further indicated in a second vehicle entry of the vehicle registry, a second user account associated with a second user (identified by User 2), has authorized one entity (identified by Entity 3) or representatives of the entity to have access to a vehicle (identified by Vehicle 2) associated with the second user. As another example, a third vehicle entry of the vehicle registry, a third user account associated with a third user (identified by User 3), has authorized two agents (identified by Agent 1-1 and Agent X) to have access to a vehicle (identified by Vehicle 3) associated with the third user.

In this way, the access management system may maintain a vehicle registry associated with vehicles and/or users of the application to permit the access management system to enable an agent or entity, as described herein, to have access to one or more of the vehicles (e.g., in association with corresponding authorizations from the users).

As further shown in FIG. 1A, and by reference number 120, the access management system maintains an entity registry. The entity registry may be associated with entities that are associated with one or more agents that may utilize the application (e.g., an agent-side version of the application). For example, the entity registry, as shown, may include entity entries associated with entities that are associated with providing one or more vehicle services. As described herein, the access management system may maintain the entity registry to verify, based on an entity entry associated with an entity or a driver, that an agent is associated with an entity and/or that the entity is a valid vehicle services provider.

As shown, the entity registry may include a registry of M entities (Entity 1 through Entity M) identified by entity identifications (Entity IDs). Entity entries in the entity registry may identify agents (Authenticated Agent Identifications) that have been authenticated by the entity authentication system and/or the access management system. In the entity registry, a first entity entry for an entity (identified by Entity 1) is associated with one authorized agent (Agent 1-1), and a second entity entry for an entity (identified by Entity 2) is associated with three authorized agents (Agent 2-1, Agent 2-2, Agent 2-3).

In this way, the access management system may maintain an entity registry associated with entities and/or agents that have been validated and/or authenticated to provide a vehicle service associated with a vehicle. The access management system may utilize the entity registry (e.g., as a whitelist) to enable the agents and/or the entities to access a vehicle as described herein (e.g., in association with corresponding authorizations from users).

Figure 1B:
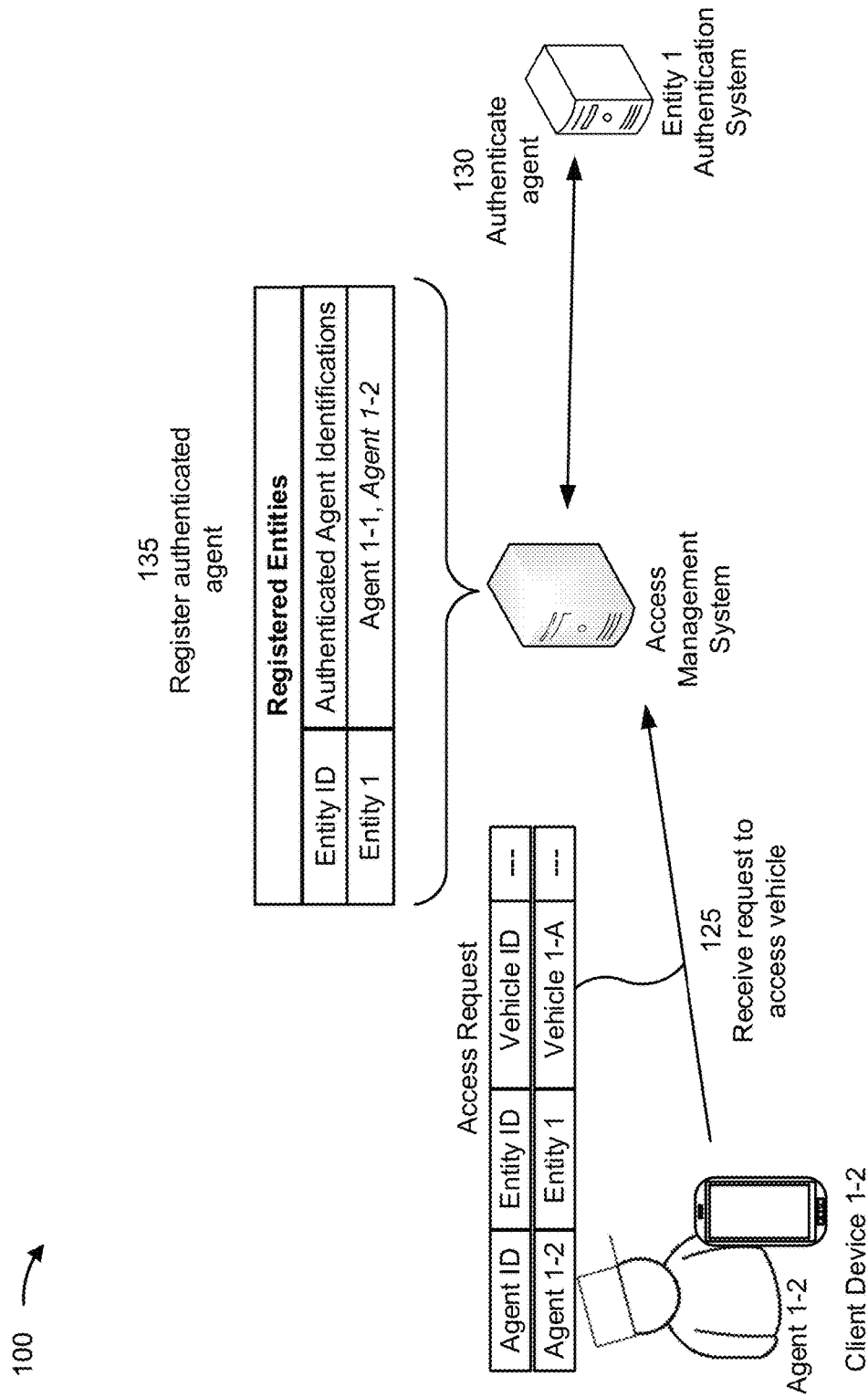

As shown in FIG. 1B, and by reference number 125, the access management system receives, from a client device, an access request. The access management system may receive the access request from a client device (Client Device 1-2) associated with an agent (Agent 1-2). The access management system may receive the access request based on the agent providing the access request in association with providing a vehicle service. For example, the agent may be assigned to provide the vehicle service on a vehicle that involves accessing the vehicle (e.g., unlocking a door or compartment of the vehicle, driving the vehicle, controlling a setting of the vehicle, or other types of access).

The agent may provide the access request to the access management system to cause the access management system, via the application, to facilitate access to the vehicle, as described herein. An instance of the application on the client device may correspond to an agent-side version of the application. The agent-side version may include certain features of the application that are specific to vehicle services providers that may provide a vehicle service associated with a vehicle, such as requesting registration with the access management system, verifying an identification associated with the entity (an "entity identification") and/or verifying an identification associated with an agent ("agent identification") in association with an authentication process described herein.

As shown, the access request may include an agent identification (Agent ID), an entity identification (Entity ID), and/or a vehicle identification (Vehicle ID). The agent identification may be a digital identification associated with the agent. For example, the agent identification may be a validated identification of the agent, such as an identification that has been validated in association with a credential of the agent (e.g., a name, a username, and an employee identifier, such as an employee number assigned to the agent by an entity), a biometric of the agent (e.g., a fingerprint, a facial structure, or other biometric feature), and/or a multi-factor authentication (e.g., using an identifier of the client device or other system).

The agent may be associated with an entity (e.g., may be an employee or representative of the entity). Accordingly, the entity identification may identify the entity (Entity 1) via the entity identification in the access request. The entity identification may be any suitable identifier of the entity (e.g., a name, an account number associated with the access management system, or the like). The agent and/or the entity may be assigned or designated to provide a vehicle service on a vehicle identified by the vehicle identification (Vehicle 1-A). The vehicle identification may be any suitable identifier of the vehicle (e.g., a vehicle identification number (VIN), a license plate number or information, or the like).

In some implementations, the access request may include other information associated with the agent, the vehicle, and/or the entity. For example, the access request may include location information associated with the vehicle access (e.g., information identifying a location of the client device, a location of the vehicle, and/or a location where a vehicle service is to be provided). Additionally, or alternatively, the access request may include vehicle service information associated with a vehicle access. The vehicle service information may identify a type of service that is to be provided, a type of access that may be required for the vehicle access (e.g., access that does or does not involve driving the vehicle, access that does or does not involve accessing an engine compartment of the vehicle, access that does or does not involve access to a computer of the vehicle, or the like).

In some implementations, the access management system may receive the access request when the client device is within a threshold distance of the vehicle. For example, the agent may request on-demand access to the vehicle device once the agent arrives at the vehicle and/or is able to obtain an identifier of the vehicle (e.g., a VIN displayed on the vehicle and/or that can be obtained by the client device, such as via a camera or a barcode reader of the client device).

Accordingly, the access management system may receive an access request associated with an agent and a vehicle.

As further shown in FIG. 1B, and by reference number 130, the access management system may authenticate the agent. The access management system may authenticate the agent based on the entity identification in the access request. For example, the access management system may identify, based on the entity identification in the access request, the entity (Entity 1) that is associated with the agent. Based on the entity registry associated with the identified entity (Entity 1) not including the agent identification of the agent (as shown in FIG. 1A), the access management system may perform an authentication process to verify that the agent is authorized to provide the vehicle service.

The access management system may request the entity to verify that the agent is associated with the entity. For example, the access management system may provide the agent identification to an entity authentication system associated with the entity (Entity 1 Authentication System) to request the entity to authenticate the agent based on the agent identification. Additionally, or alternatively, the access management system may provide the vehicle identification to request the entity authentication system to verify that the agent is to access the vehicle identified by the vehicle identification. The access management system may authenticate the agent based on receiving, from the entity (and/or the entity authentication system), an authentication of the agent identification that verifies that the agent is associated with the entity.

In this way, the access management system, based on the agent identification and/or the entity identification, may authenticate the agent in association with providing a vehicle service.

As further shown in FIG. 1B, and by reference number 135, the access management system may register the agent as an authenticated representative of the entity. For example, as shown, the access management system may update an entity entry associated with the entity (Entity 1) to indicate that the agent (Agent 1-2) is associated with the entity. More specifically, the access management system may update the entity entry to include an agent identification associated with the agent. Accordingly, the updated entity entry may indicate that the entity, as a valid vehicle services provider, has a first agent (Agent 1-1) and a second agent (Agent 1-2) that may be authorized to access a vehicle in association with providing a vehicle service (e.g., as representatives of the entity).

In this way, if the access management system receives a subsequent access request that includes the agent identification and the entity identification, the access management system may forgo authentication of the agent (e.g., because the agent is indicated as authenticated in the entity registry).

Figure 1C:
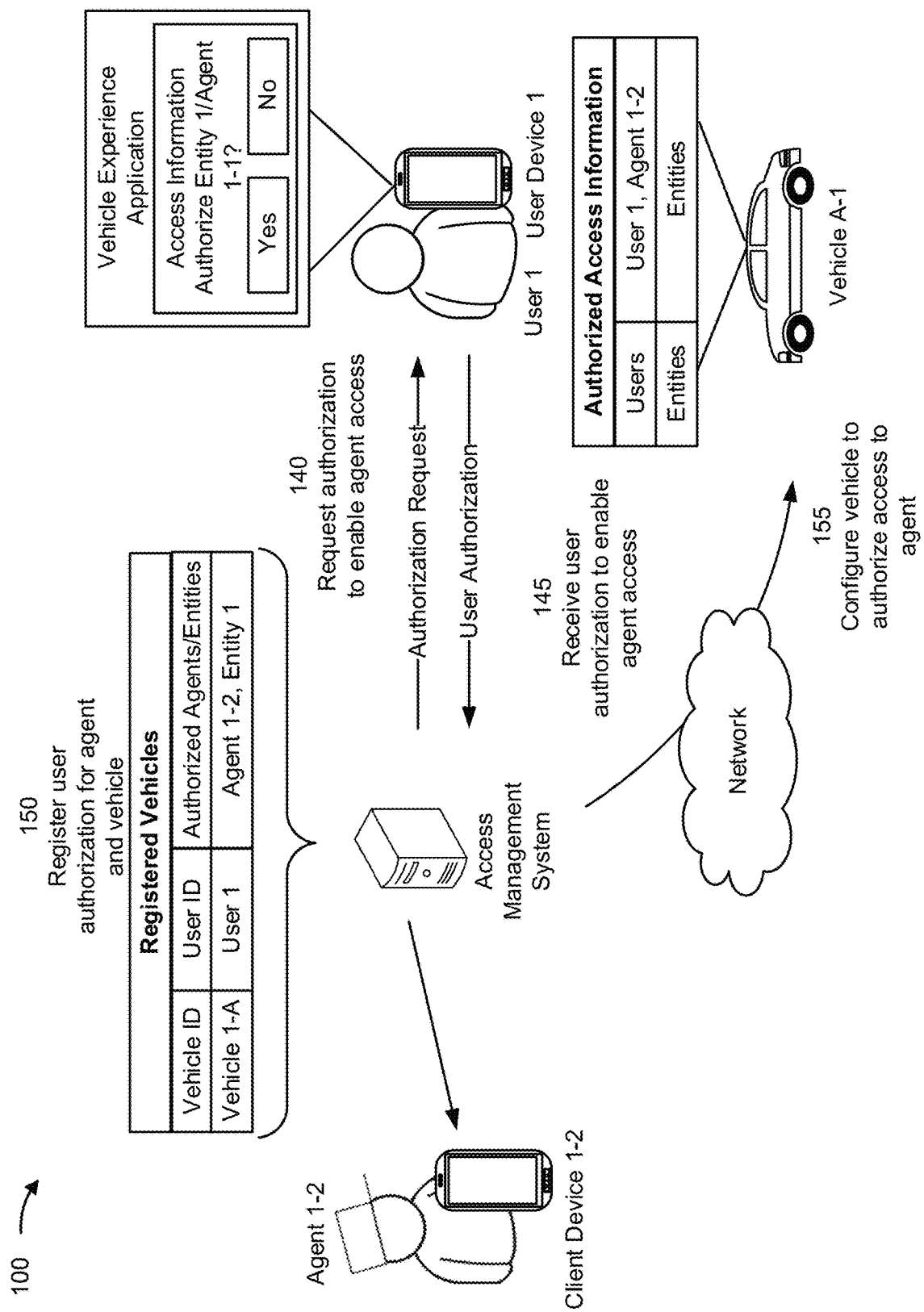

As shown in FIG. 1C, and by reference number 140, the access management system may request authorization, from the user, to enable agent access. For example, the access management system may send an authorization request to request the user to authorize the agent to access the vehicle. As shown, the access management system may send the authorization request to the user device associated with the user (e.g., via the application). For example, the access management system may look up, in the vehicle registry, a user account that is associated with the vehicle identification (Vehicle 1-A) included in the access request depicted in FIG. 1B. Based on determining that the agent or the entity are not authorized to access the vehicle (e.g., as indicated in the vehicle registry depicted in FIG. 1A), the access management system may send an access request (e.g., an on-demand access request) to the user to obtain user authorization for the agent and/or the entity to access the vehicle.

The access management system may send the authorization request to the user device (User Device 1) based on the user being associated with the vehicle identified in the access request. For example, based on identifying that the user is mapped to and/or associated with the vehicle identification in the vehicle registry, the access management system may send the authorization request to the user device. The access management system may send the user authorization to the user device that is associated with the user based on a user-side version of the application being installed on the user device and the user being logged into the application on the user device. Additionally or alternatively, the access management system may send the authorization request via a message (e.g., a text message or an email) and/or based on identifying contact information or message information associated with contacting the user via the user device.

The authorization request may include information associated with the agent accessing the vehicle. For example, the authorization request may indicate location information associated with the vehicle access and/or vehicle services information associated with the vehicle access (e.g., to give context for authorizing the vehicle access). In some implementations, the authorization request may request the user to indicate and/or provide any vehicle access restrictions associated with enabling the agent to access the vehicle.

The authorization request may include information associated with the agent and/or an image of the agent. For example, the authorization request may include an image of the agent that is captured by a camera of the client device and/or a camera of the vehicle (e.g., as the agent approaches the vehicle to access the vehicle as described herein). Accordingly, the user may receive information associated with the agent and/or an image of the agent in order to authenticate the agent and/or authorize the agent to access the vehicle.

Accordingly, as shown, the access management system may send the authorization request to the user via the application (e.g., via the user account of the application).

As further shown in FIG. 1C, and by reference number 145, the access management system receives user authorization to enable the agent to access the vehicle. For example, the user may authorize the access via the user-side version of the application or a response message (e.g., a response text message or response email) to the authorization request. The user authorization may authorize the specific agent and/or the entity to access the vehicle. For example, the user authorization may specify that only the agent identified in the authorization request is authorized to access the vehicle. Additionally, or alternatively, the user authorization may authorize any entity that is associated with the entity (e.g., any agent that has authenticated by the access management system) to access the vehicle.

In some implementations, the user authorization may indicate vehicle access restrictions associated with the agent accessing the vehicle. For example, the user, within the user authorization, may identify a designated location associated with the agent accessing the vehicle, a designated area within which the agent has access to the vehicle, a designated time period when the agent may access the vehicle, a length of a time period during which the agent has access to the vehicle, and/or a designated limit associated with a performance metric (e.g., a speed limit, an acceleration limit, or the like) of the vehicle, among other examples.

In some implementations, if the user indicates that the agent is not authorized to access the vehicle, the access request from the client device may be denied. For example, the access management system may send a notification to the client device to indicate that the agent is not authorized to access the vehicle.

As further shown in FIG. 1C, and by reference number 150, the access management system registers the user authorization for the agent and the vehicle. For example, as shown, the access management system may update the vehicle entry for the vehicle to indicate that the agent and/or the entity are authorized to access the vehicle. More specifically, the access management system may update the vehicle entry to include the agent identification associated with the agent and/or an entity identification associated with the entity. Accordingly, the updated vehicle entry may indicate that the agent (or another agent associated with the entity as indicated by the entity identification) is authorized to access the vehicle according to the user authorization.

In this way, if the access management system receives a subsequent access request that includes the vehicle identification along with the agent identification and/or the entity identification, the access management system may forgo requesting the user to provide a user authorization (e.g., because the agent and/or entity is indicated as authorized to access the vehicle in the vehicle registry).

As further shown in FIG. 1C, and by reference number 155, the access management system configures the vehicle to provide access to the agent. For example, the access management system may provide the agent identification and/or the entity identification to the vehicle to cause the vehicle to store and/or maintain the agent identification and/or the entity identification in association with enabling access to the vehicle. For example, the vehicle may store and/or maintain the agent identification and/or entity identification (along with other identifications associated with other individuals or devices) in a data structure. The vehicle, upon detection of or receiving a signal that includes the agent identification and/or entity identification, may look up the agent identification and/or the entity identification in the data structure to verify that the agent associated with a client device that broadcast the signal is authorized to access the vehicle.

In some implementations, the access management system may configure the vehicle to facilitate the vehicle access according to one or more vehicle access restrictions that are identified in the user authorization. In this way, the vehicle may restrict the agent from controlling the vehicle in a certain manner (e.g., according to a limit of a performance metric), having access to certain features, having access to the vehicle in a certain area or at a certain location, having access to the vehicle during a certain time period, and so on.

Figure 1D:
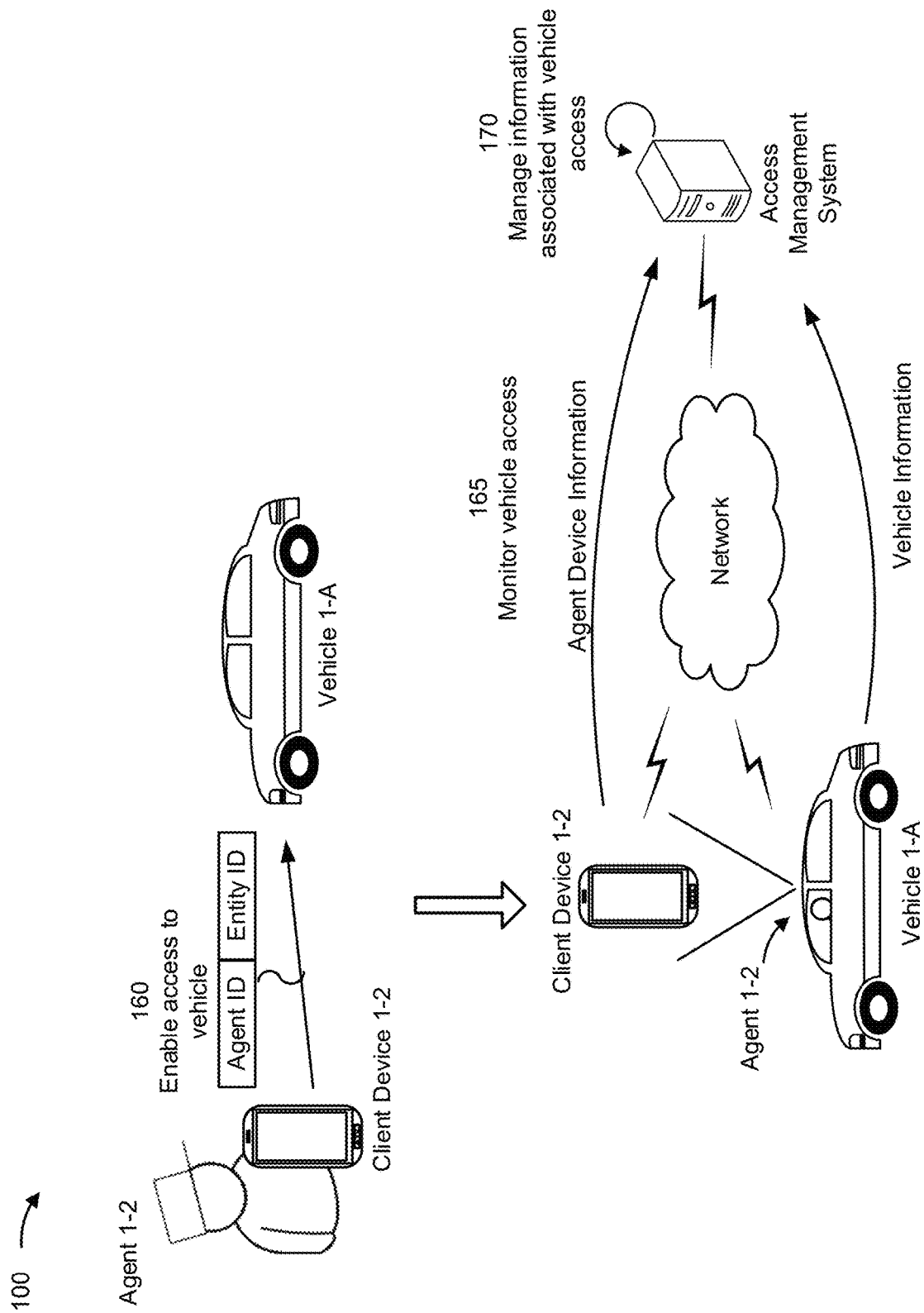

As shown in FIG. 1D, and by reference number 160, the vehicle enables access to the agent. For example, the client device may broadcast or emit a signal that is configured to wirelessly control an access device of the vehicle. The signal may include an agent identification and/or an entity identification (e.g., via a short range wireless communication signal, such as a Bluetooth signal, a Wi-Fi signal, or the like). Accordingly, based on agent identification and/or entity identification being received and/or stored by the vehicle, the signal may be configured to cause the vehicle to unlock an access device of the vehicle to facilitate access to the vehicle.

In this way, when the client device is within a communication range of the vehicle and/or the vehicle receives the signal from the client device that includes the agent identification and/or the entity identification, the vehicle (via the vehicle-side version of the application) may enable the agent to access the vehicle. For example, the vehicle may unlock a door of the vehicle, open the door of the vehicle, unlock a computer of the vehicle to facilitate control of the vehicle, unlock an onboard application associated with controlling a feature of the vehicle, or unlock access to other features of the vehicle.

In this way, the access management system may facilitate access to the vehicle by causing or enabling the vehicle to allow the agent to access the vehicle via the client device. For example, the agent identification being provided to the vehicle may cause the vehicle to unlock an access device of the vehicle based on the client device communicating the agent identification to the vehicle.

As further shown in FIG. 1D, and by reference number 165, the access management system may monitor the vehicle access. For example, the access management system may be configured to monitor the vehicle access in association with the vehicle access restrictions. Accordingly, the access management system may receive location information associated with the vehicle and/or the client device (e.g., via the application), timing information associated with the vehicle access (e.g., to ensure that a time period associated with the vehicle access does not expire prior to the agent completing a vehicle service), and/or performance metric information associated with the vehicle during the vehicle access (e.g., speed measurements, acceleration measurements, and/or engine status measurements).

In some implementations, based on the vehicle traveling outside of a particular distance from a designated location associated with the user enabling access to the vehicle (e.g., using a geofence or the like), the access management system may send a notification to the user device or other system to alert the agent (or other authorities) of potential fraudulent activity involving the vehicle (which may involve a theft of the vehicle). Additionally, or alternatively, the access management system may similarly provide a notification to the entity authentication system if the vehicle, during the vehicle access, appears to be driven outside of a designated area and/or from a different course provided by the user in association with authorizing the vehicle access. In some implementations, in the event that the agent, via the client device, stops sharing location information associated with the client device, the access management system may similarly send a notification to the user or entity authentication system to indicate potential fraudulent activity associated with an inability to monitor the vehicle access.

In some implementations, the access management system may monitor the vehicle access via one or more onboard sensors or cameras of the vehicle. For example, the access management system may utilize a camera that is configured to monitor a driver of the vehicle and/or a fingerprint scanner (or other type of biometric sensor) that is configured to enable the vehicle access based on the agent being the only driver of the vehicle and/or based on the agent providing a fingerprint scan of the agent's fingerprint (e.g., periodically, such as every minute, every five minutes, every fifteen minutes, or the like). In this way, the access management system may ensure that the agent that is authorized to access (and/or drive) the vehicle is the individual that is accessing the vehicle.

As further shown in FIG. 1D, and by reference number 170, the access management system manages information associated with the vehicle access. For example, the access management system may store information from the user device, the client device, and/or the vehicle to manage, via a record log, the vehicle access. The record log may be associated with the user, the vehicle, the agent, and/or the entity (e.g., to maintain a database of vehicle accesses to the vehicle, to maintain a database of agents that have access the vehicle, to determine or track a level of trust associated with agents or entities, and so on).

In some implementations, activity by the agent (e.g., captured by the vehicle and/or a camera of the vehicle) may be provided to the user device, the access management system, and/or the entity authentication system to enable the user, the access management system, and/or the entity authentication system to score or rate the agent's activity in association with providing the vehicle service.

In some implementations, the access management system may request and/or receive feedback from the user via the user device. The feedback may be associated with the vehicle access and indicate whether the agent adequately provided a vehicle service associated with the vehicle, whether the agent accessed the vehicle in a satisfactory manner, whether the user was satisfied with certain characteristics of the received vehicle service, and/or a sentiment of the user relative to the agent, the entity, or the vehicle access. Accordingly, the access management system may store, in a record log, vehicle access information associated with a vehicle access.

Accordingly, as described herein, the access management system may enable a user to authorize (e.g., via a preauthorization or an on-demand authorization) access to a vehicle by an agent using an identification of the agent and/or an entity associated with the agent and a client device. In this way, the access management system may avoid consumption of resources with respect to generating and/or provisioning a digital vehicle key for individual instances of an agent having to access a vehicle service and/or provide a vehicle service that requires access to the vehicle. Moreover, the access management system may provide, over other systems, improved security and user control of a vehicle access along with a more convenient user experience associated with authorizing an agent or entity to drive the vehicle, without sacrificing the safety or security of the vehicle or the user. Furthermore, the access management system may allow for improved efficiency with respect to offering access to a vehicle by enabling a user to authorize vehicle access to an agent or entity without requiring an in-person interaction between the user and the agent or a representative of the entity.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
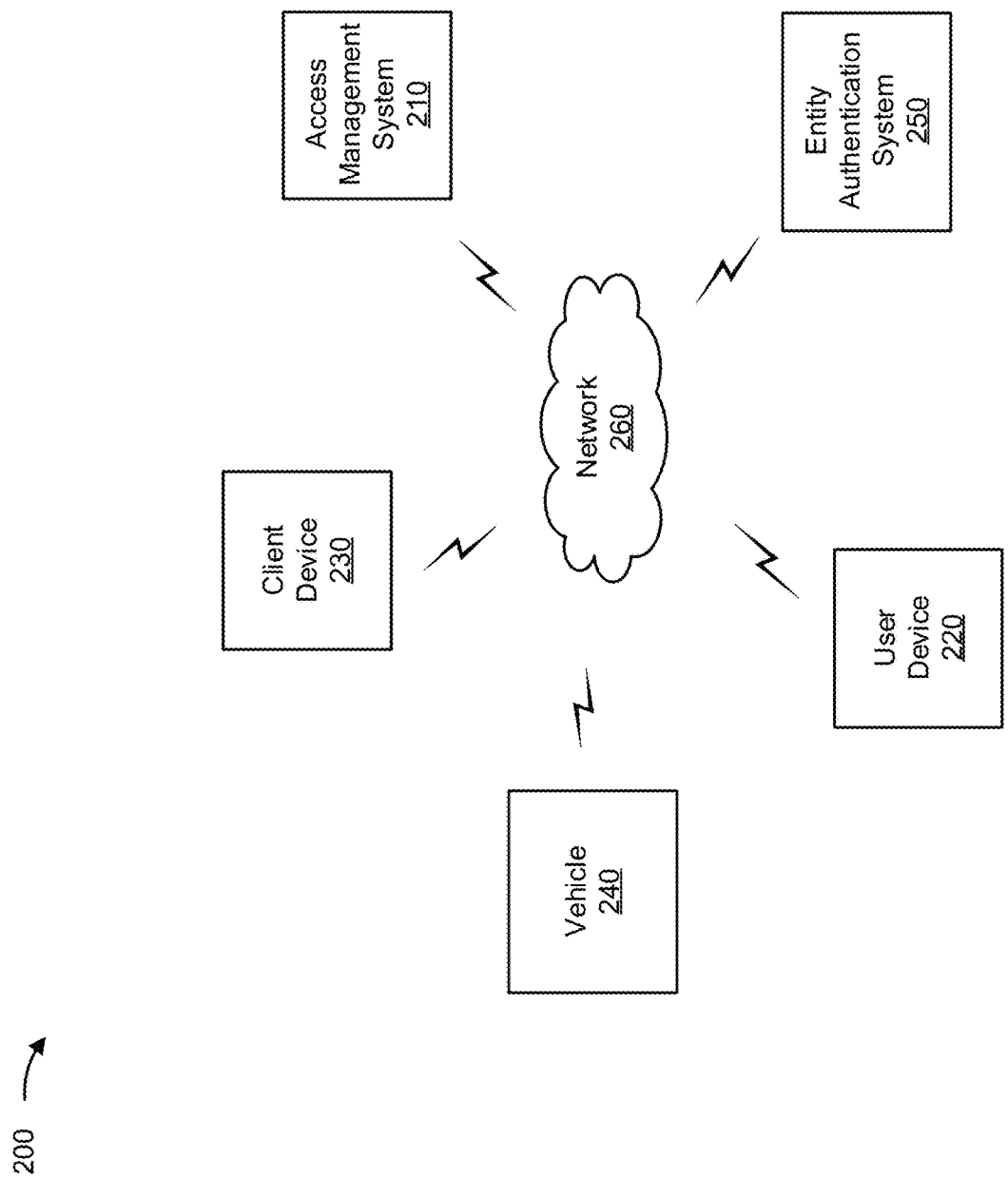
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an access management system 210, a user device 220, a client device 230, a vehicle 240, an entity authentication system 250, and a network 260. Devices of environment 200 may interconnect via wired connections, wireless connections, or a combination of wired and wireless connections.

The access management system 210 includes one or more devices capable of receiving, generating, storing, processing, providing, and/or routing information associated with managing access to a vehicle, as described elsewhere herein. The access management system 210 may include a communication device and/or a computing device. For example, the access management system 210 may include a server, such as an application server, a client server, a web server, a database server, a host server, a proxy server, a virtual server (e.g., executing on computing hardware), or a server in a cloud computing system. In some implementations, the access management system 210 includes computing hardware used in a cloud computing environment.

The user device 220 includes one or more devices capable of receiving, generating, storing, processing, and/or providing information associated with a user authorizing access to a vehicle, as described elsewhere herein. The user device 220 may include a communication device and/or a computing device. For example, the user device 220 may include a wireless communication device, a mobile phone, a user equipment, a laptop computer, a tablet computer, a desktop computer, a set-top box, a wearable communication device (e.g., a smart wristwatch, a pair of smart eyeglasses, a head mounted display, or a virtual reality headset), or a similar type of device.

The client device 230 includes one or more devices capable of receiving, generating, storing, processing, and/or providing information associated with requesting access to a vehicle and/or accessing a vehicle, as described elsewhere herein. The client device 230 may include a communication device and/or a computing device. For example, the client device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The vehicle 240 includes one or more devices capable of receiving, generating, storing, processing, and/or providing information associated with enabling an agent associated with the client device 230 to access the vehicle 240 according to authorization by a user associated with user device 220 and an authentication of the agent, as described elsewhere herein. The vehicle 240 may include a communication device and/or a computing device. For example, the vehicle 240 may be capable, via the communication device and/or the computing device, of being configured to enable access to the vehicle 240 via a digital identification, a particular communication, and/or a particular instruction (e.g., from the access management system 210 and/or the user device 220), as described elsewhere herein.

The entity authentication system 250 includes one or more devices capable of receiving, generating, storing, processing, providing, and/or routing information associated with authenticating an agent and/or an entity, as described elsewhere herein. The entity authentication system 250 may include a communication device and/or a computing device. For example, the entity authentication system 250 may include a server, such as an application server, a client server, a web server, a database server, a host server, a proxy server, a virtual server (e.g., executing on computing hardware), or a server in a cloud computing system. In some implementations, the entity authentication system 250 includes computing hardware used in a cloud computing environment.

The network 260 includes one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
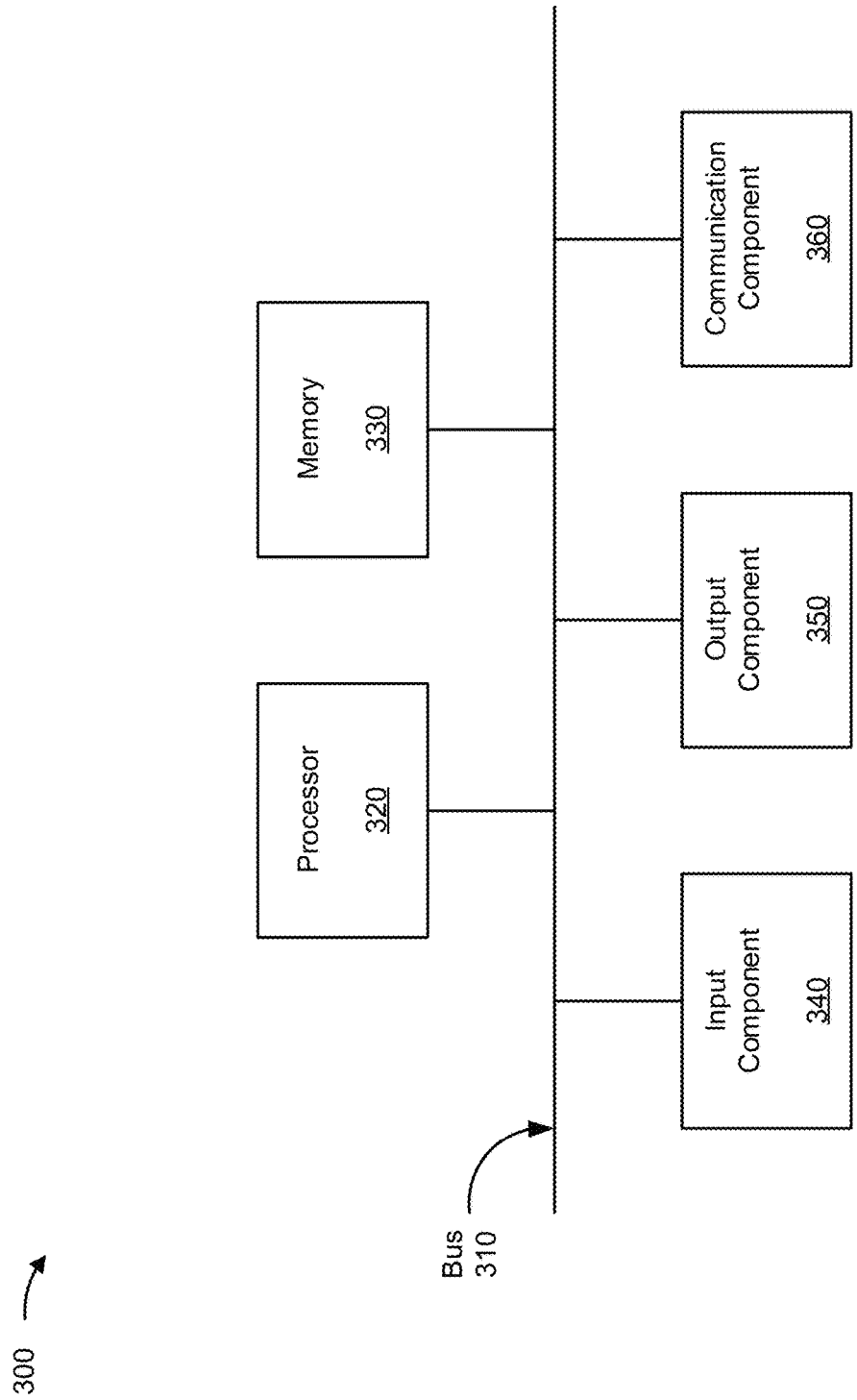
FIG. 3 is a diagram of example components of one or more devices of FIG. 2.

FIG. 3 is a diagram of example components of a device 300, which may correspond to the access management system 210, the user device 220, the client device 230, the vehicle 240, and/or the entity authentication system 250. In some implementations, the access management system 210, the user device 220, the client device 230, the vehicle 240, and/or the entity authentication system 250 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with a system for managing access to a vehicle by a service provider that is to provide a service associated with the vehicle. In some implementations, one or more process blocks of FIG. 4 may be performed by an access management system (e.g., access management system 210). In some implementations, one or more process blocks of FIG. 4 may be performed by another device or a group of devices separate from or including the access management system, such as the user device 220, the client device 230, the vehicle 240, and/or the entity authentication system 250. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving an access request associated with an agent and a vehicle (block 410). As further shown in FIG. 4, process 400 may include authenticating, based on an agent identification associated with the agent, the agent in association with providing the vehicle service (block 420). As further shown in FIG. 4, process 400 may include sending, based on authenticating the agent, an authorization request to a user associated with the vehicle (block 430). The authorization request may be sent to a user device associated with the user that enables the user to authorize the agent to access the vehicle in association with providing the vehicle service.

As further shown in FIG. 4, process 400 may include receiving, from a user device, a user authorization that authorizes the agent to access the vehicle (block 440). As further shown in FIG. 4, process 400 may include providing, to the vehicle, the agent identification to enable the agent to access the vehicle via a client device associated with the agent (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for enabling access to a vehicle in association with providing a vehicle service, the system comprising:
   one or more memories; and
   one or more processors, communicatively coupled to the one or more memories, configured to:
      receive an access request associated with an agent and the vehicle,
         wherein the access request includes an agent identification associated with the agent and a vehicle identification associated with the vehicle;
      perform, based on the agent identification, an authentication process to verify that the agent is authorized to provide the vehicle service;
      send, based on verifying that the agent is authorized to provide the vehicle service, an authorization request to request a user associated with the vehicle to authorize the agent to access the vehicle,
         wherein the authorization request is sent to a user device associated with the user;
      receive, from the user device, a user authorization that authorizes the agent to access the vehicle; and
      provide, to the vehicle, the agent identification to enable the agent to access the vehicle via a client device associated with the agent.

2. The system of claim 1, wherein the authentication process is performed based on obtaining a verification from an entity that indicates that the agent is associated with the entity,
   wherein the entity is identified in the access request, and
   wherein the entity is a vehicle services provider of the vehicle service.

3. The system of claim 2, wherein the verification is obtained from the entity based on the entity being registered as the vehicle services provider of the vehicle service in an entity registry.

4. The system of claim 1, wherein the authorization request is sent to the user based on the user being associated with the vehicle in a vehicle registry.

5. The system of claim 1, wherein the agent identification is provided to the vehicle to cause the vehicle to unlock an access device of the vehicle based on the client device communicating the agent identification to the vehicle.

6. The system of claim 1, wherein the one or more processors are further configured to:
   send a notification to the client device that indicates that the agent is authorized to access the vehicle.

7. The system of claim 1, wherein the one or more processors are further configured to:
   monitor, via vehicle access information from the client device or the vehicle, a vehicle experience involving the agent accessing the vehicle; and
   facilitate operation of the vehicle for the vehicle experience based on the vehicle access information.

8. A non-transitory computer-readable medium storing a set of instructions, the set of instructions comprising:
   one or more instructions that, when executed by one or more processors of a device, cause the device to:
      maintain, in a vehicle registry, a vehicle entry that indicates that a user is associated with a vehicle;
      maintain, in an entity registry, an entity entry that indicates that an entity is associated with providing a vehicle service;
      receive, from a client device associated with the entity, an access request that identifies the vehicle;
      send, based on the vehicle entry and the access request identifying the vehicle and the entity, an authorization request to a user device associated with the user,
         wherein the authorization request is configured to enable the user to authorize the entity to access the vehicle;
      receive, from the user device, a user authorization that authorizes the entity to access the vehicle; and
      configure, using an identifier associated with the entity, the vehicle to enable access to the vehicle based on the vehicle receiving the identifier from the client device via a short range communication signal.

9. The non-transitory computer-readable medium of claim 8, wherein the vehicle entry is maintained in the entity registry based on the user registering the vehicle to enable a vehicle experience that involves an agent that is associated with the entity accessing the vehicle,
   wherein the agent is not the user.

10. The non-transitory computer-readable medium of claim 8, wherein the entity entry is stored in the entity registry based on registering the entity as a valid vehicle services provider that provides the vehicle service.

11. The non-transitory computer-readable medium of claim 8, wherein the authorization request is sent to the user device based on the vehicle entry indicating that the user is associated with the user device.

12. The non-transitory computer-readable medium of claim 8, wherein the identifier is an agent identification associated with an agent that is associated with the entity, and wherein the one or more instructions, to configure the vehicle to enable access to the vehicle, cause the device to:
provide the agent identification to the vehicle,
wherein the agent identification is configured to be broadcast from the client device to wirelessly unlock an access device of the vehicle based on the agent identification being provided to the vehicle.

13. The non-transitory computer-readable medium of claim 8, wherein the identifier is an entity identification associated with the entity, and
wherein the one or more instructions, to configure the vehicle to enable access to the vehicle, cause the device to:
provide the entity identification to the vehicle,
wherein the entity identification is configured to be broadcast in a signal to wirelessly control an access device of the vehicle.

14. The non-transitory computer-readable medium of claim 8, wherein the one or more instructions further cause the device to:
receive, within the user authorization, a vehicle access restriction associated with a vehicle experience that involves the entity accessing the vehicle; and
monitor, based on detecting that the vehicle is accessed by the client device, vehicle access information,
wherein the vehicle access information is received from the client device or the vehicle during the vehicle experience; and
facilitate operation of the vehicle based on the vehicle access information and the vehicle access restriction.

15. A method enabling access to a vehicle in association with providing a vehicle service, comprising:
receiving, by a device, an access request associated with an agent and the vehicle;
identifying, by the device and based on an entity identification in the access request, an entity associated with the agent;
requesting, by the device and based on the entity identification, the entity to verify that the agent is associated with the entity based on an agent identification;
receiving, by the device and from the entity, an authentication of the agent identification that verifies that the agent is associated with the entity;
authenticating, by the device and based on the authentication of the agent identification, the agent in association with providing the vehicle service;
sending, by the device and based on authenticating the agent, an authorization request to a user associated with the vehicle,
wherein the authorization request is sent to a user device associated with the user that enables the user to authorize the agent to access the vehicle in association with providing the vehicle service;
receiving, by the device and from the user device, a user authorization that authorizes the agent to access the vehicle; and
configuring, by the device, the vehicle to enable the agent to access the vehicle via a client device associated with the agent.

16. The method of claim 15, wherein the access request is received from the client device.

17. The method of claim 15, wherein the entity is requested to verify that the agent is associated with the entity based on the entity being identified, in an entity registry, as a valid vehicle services provider of the vehicle service.

18. The method of claim 15, wherein configuring the vehicle to enable access to the vehicle comprises:
configuring the vehicle to enable the agent to access the vehicle according to a vehicle access restriction that is identified in the user authorization.

19. The method of claim 18, wherein the vehicle access restriction comprises at least one of:
a designated location associated with the agent accessing the vehicle,
a designated area within which the agent has access to the vehicle,
a designated time period associated with the agent accessing the vehicle,
a designated time period during which the agent has access to the vehicle, or
a designated limit associated with a performance metric of the vehicle.

20. The method of claim 15, wherein the authorization request is sent to the user based on the user being associated with the vehicle in a vehicle registry.

* * * * *